United States Patent [19]

Kedem et al.

[11] 4,226,688
[45] Oct. 7, 1980

[54] ELECTRODIALYSIS DEVICE

[75] Inventors: Ora Kedem; Tamar Robinson, both of Rehovot, Israel

[73] Assignee: Yeda Research and Development Co. Ltd., Rehovot, Israel

[21] Appl. No.: 932,408

[22] Filed: Aug. 9, 1978

[30] Foreign Application Priority Data

Aug. 16, 1977 [IL] Israel .......................................... 52758

[51] Int. Cl.$^2$ ............................................. B01D 13/02
[52] U.S. Cl. ................................. 204/180 P; 204/301
[58] Field of Search .................... 204/301, 180 P, 154, 204/1 R

[56] References Cited

U.S. PATENT DOCUMENTS

| 2,860,095 | 11/1958 | Katz et al. | 204/301 X |
| 3,192,143 | 6/1965 | Roe et al. | 204/301 X |
| 3,966,571 | 6/1976 | Gagnon et al. | 204/1 R X |
| 3,969,201 | 7/1976 | Oloman et al. | 204/1 R X |

Primary Examiner—Arthur C. Prescott
Attorney, Agent, or Firm—Browdy and Neimark

[57] ABSTRACT

According to the present invention there is provided an improved electrodialysis device comprising an electrodialysis stack with an anode compartment adjacent one end of the stack, a cathode compartment adjacent the other end of the stack, said electrode compartments being connected with each other by means of conduits, means being provided for circulating a slurry of carbon particles between the two electrode compartments. The slurry comprises finely powdered active carbon in an electrolyte, either by itself or in combination with finely powdered ion-exchange resin. The electrode compartments can be provided with inserts defining constrictions for the outflow of the slurry at the lower part of the inserts thus establishing a higher concentration of the particles at the lower part of the compartment. The invention further relates to an eletrodialysis process wherein a slurry of carbon particles is circulated between the electrode compartments.

16 Claims, 2 Drawing Figures

ELECTRODIALYSIS DEVICE

FIELD OF THE INVENTION

Improvements in electrodialysis devices adapted to reduce scale formation and damage to membranes adjacent to the electrodes and to the electrodes proper due to formation of bases and acids, and due to evolution of chlorine. Resulting electrodialysis stacks have a long life-time and are reliable in their operation and quite trouble-free during prolonged periods of time. Corrosion damage and scale formation are substantially decreased or even eliminated.

BACKGROUND OF THE INVENTION

In electrodialysis stacks there exists the problem of membrane deterioration, and especially of the membranes close to the electrodes. The electrodes themselves have a limited period of life as they are corroded and thus special materials must generally be used which are corrosion resistant. The above problems are the result of the formation of chlorine which tends to attack the membranes and also the electrodes, and also of acid and base formation. For every Faraday of current passed through an electrolysis stack one equivalent of acid and one of base have to be rinsed away. Generally acid is added to the cathode compartment to prevent scale formation and the acid from the anode compartment is generally discarded as it is contaminated by chlorine. If chlorine formation can be eliminated, it ought to be possible to continuously neutralize the acid and the base which is formed by circulating the anolyte and the catholyte. Generally this is not feasible as a large buffering capacity is required.

It is known to use certain redox systems for decreasing the above defined problems. Thus, certain quinones or similar compounds may be oxidized and reduced. Certain cations such as iron or the like can be used for the same purpose. These additives are quite problematical as it is imperative that even traces of these should be prevented from passing through the membranes; they must be non-toxic, not too expensive, stable, and not precipitate on the membranes. Results obtained with conventional redox systems have not been satisfactory.

SUMMARY OF THE INVENTION

Means are provided for reducing and for practically eliminating scale formation and problems of corrosion and of membrane deterioration in the anode and cathode compartment of electrodialysis stacks and of the membranes bordering such compartments. According to the present invention there is provided a system consisting of an electrodialysis stack, there being provided an electrolyte containing an adequate quantity of carbon particles, which is circulated between the anode and the cathode compartments. If only carbon particles are added to the electrolyte, there is used a quantity of at least about 5 percent by weight of the active carbon particles calculated on the electrolyte, which ought to contain at least 2 percent of salt. The carbon particles are preferably a fine powder of active charcoal. According to a further embodiment of the invention such carbon powder is used in combination with a fine powder of an anion-selective or a cation-selective exchange resin, or a combination of both types of such resin. Good results are obtained when at least about 1 percent by weight is used with about 1 percent by weight of anion-selective or cation-selective resin, or with about 1 percent by weight of a mixture of the two types of resin in a suitable electrolyte. The carbon powder can be used over prolonged periods of time, and when its efficacy starts to decrease, it is simply discarded. Generally an electrodialysis device can be operated for about a month without change of the carbon. According to yet a further embodiment of the invention means are provided for circulating the slurry of coal particles (possibly together with particles of ion-exchange resin) in such manner that a quite high concentration of these is established in the electrode compartments adjacent the electrodes.

By resorting to the use of slurries of carbon particles in a suitable electrolyte the voltage drop in the electrode compartments can be drastically reduced. In some cases the voltage drop was reduced from 8 V to about 2 to 3 V at 10 mA/cm$^2$ of the membrane area, if the weight fraction of carbon particles near the electrodes is of the order of an average of 15 to 30 percent by weight so that electron transfer between the carbon particles by direct contact is facilitated. The slurry can be circulated from the anode compartment to the cathode compartment and vice versa as a dilute suspension of carbon particles. By using a funnel-shaped insert, the particles are concentrated in the lower part of such insert and thus a high relative concentration is established adjacent the electrode. Typical values are about 5% carbon in the dilute slurry and an average concentration of about 15-20 percent adjacent the electrodes. Such a system prevents evolution of chlorine and the voltage drop between each electrode compartment and the adjacent brine cell is reduced to about 2.5 V at a current density of about 10 mA/cm$^2$ of membrane area. The ion exchange resin and the carbon are used in the form of fine particles, such as for example fractions of a millimeter mean grain size. A size of the order of lower than 1/10 mm gives good results. Good results were obtained with very finely powdered carbon and optionally with 200 mesh resin. When used in combination, the ion exchange resin and the active carbon are used in a weight ratio of from about 1:3 to 3:1, the preferred ratio being about 1:1 by weight. As carrier there is used a suitable electrolyte, and good results were obtained with aqueous solutions of sodium chloride of a concentration of about 1 to 2 weight-%. The ion exchange resin and the active carbon are used in the form of a suspension of about 1% by weight ion exchange resin and 1% by weight active carbon in 98% by weight of aqueous sodium chloride solution. This is about the lower limit, and higher concentrations, as for example, about 5 to 10 weight-percent of the resin and the same of the active carbon can be used. The suspension can be moved by means of a bubble lift and circulated between the anolyte and the catholyte compartments. The combination of ion exchange resin and of active carbon results in the desired effect.

It is assumed that the particles of the cation exchange resin take up H$^+$-ions and that these are released at the cathode. The active carbon seems to take up gaseous hydrogen liberated at the cathode, and to release this at the anode. It is possible that the active carbon takes up electrons and transfers these between the electrodes where the charge of the particles is neutralized by a double layer surrounding it. When this phenomenon takes place, which is termed electrosorption, no acid or base is formed.

At pointed out above, when only carbon is used, the electrolyte ought to contain at least 2 percent by weight of salts.

The circulation of the slurry of carbon powder, either alone at the concentration defined above, or in combination with an anion- or a cation-selective exchange resin, or a combination with both such resins, in a suitable electrolyte between the anode and the cathode compartments, at a rate of circulation of at least about 1 ml/cm$^2$ membrane area/minute, prevents acid and base formation and no chlorine is evolved. This obviates the requirement to provide complicated and expensive control equipment. Readily available electrodes can be used and corrosion problems of these are substantially reduced. Scale formation is greatly reduced. The current efficiency of the overall process is not affected. Suspensions of this type, both with and without resin exchange resins were tried out over prolonged periods of time (over many hundreds of hours) and no deterioration of the activity of the carbon was observed. After a prolonged period of time this is discarded and replaced by fresh active carbon.

In practice the electrodialysis stack is built so as to provide separate electrode compartments at the two ends of the stack, one containing the cathode and the catholyte, the other the anode and the anolyte. The boundary to the stack compartment is constituted by suitable exchange membranes, preferably cation selective membranes. Conduits are provided from the anolyte compartment to the catholyte compartment and vice versa, and the suspension is circulated between the two compartments. The circulating mixture constitutes a phase conducting ions and electrons. Hydrogen and oxygen are adsorbed by the carbon while protons formed or consumed by the electrodes are absorbed or supplied by the ion exchanger. With 5% carbon or more electrosorption of ions seems to replace the electrode reactions.

The required rate of circulation is at least about 1 ml/min/cm$^2$ of membrane area and preferably above 2 ml/cm$^2$/minute. The suspension is circulated and this prevents also the short-circuiting by means of the active carbon.

It is possible to use a combination of anion-selective resin and cation-selective resin in combination with finely powdered active carbon.

The resin and carbon are suspended in an electrically conducting liquid. Good results are obtained in a solution of sodium chloride. Other suitable salts can be used.

It is sometimes advantageous to use a cathode compartment having a larger volume than the volume of the anode compartment. A ratio of volumes of about 3:1 gave good results. By such an arrangement it is possible to maintain the active carbon for a comparatively longer period of time in a reductive environment (near the cathode) and a shorter time near the anode (oxidizing environment). The active carbon charged with hydrogen is thus maintained for a longer time near the cathode and this improves the overall performance of the system.

BRIEF DESCRIPTION OF THE DRAWINGS

The invention is illustrated with reference to the enclosed schematical drawings, which is not according to scale and in which.

DESCRIPTION OF THE PREFERRED EMBODIMENT

Figure 1:
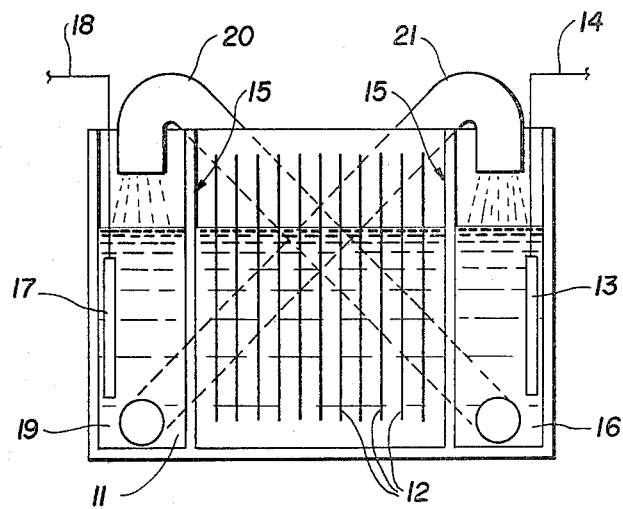
FIG. 1 is a schematical sectional side view through an electrodialysis stack provided with circulation means according to the present invention.

As shown in FIG. 1 the electrodialysis stack 11 according to the invention comprises a conventional stack of electrodialysis membranes 12 with porous members 15 defining the boundary between the compartment of the stack and the electrode compartments 16 and 19. The anode 13 is connected by wire 14 to a current source (not shown) and cathode 17 is connected by wire 18 to the current source. The two electrode compartments 16 and 19 are connected via two conduits 20 and 21 with each other, means (not shown) being provided for circulating the suspension from each of these compartments to the other at a predetermined rate of circulation. Such means may be a conventional circulation pump.

Figure 2:
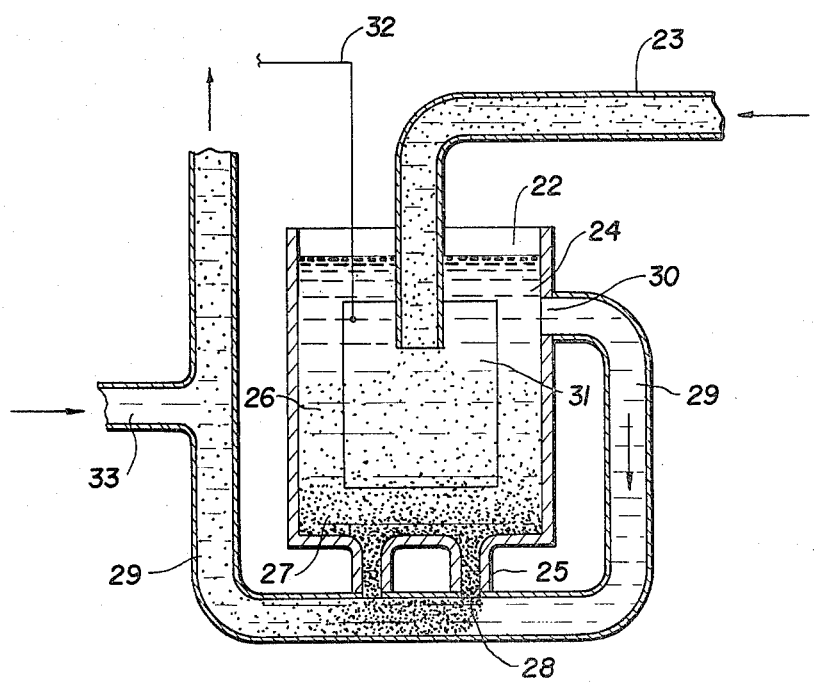
FIG. 2 is a sectional schematical side-view through an electrode compartment according to the invention.

A preferred embodiment of an electrode compartment to be used in a device according to the present invention is illustrated with reference to FIG. 2. The idea is to circulate a slurry of carbon particles (possibly in combination with ion-exchange resin particles) between the two electrode compartments, and to resort to means whereby there is established a considerably higher concentration of such particles in the vicinity of the electrode in the compartment. Dilute slurry is added to compartment 22 via conduit 23 from the other electrode compartment by means of a circulation pump or bubble lift, and this enters vessel 24 which has two narrow outlets 25 at its lower part. Thus the slurry separates into a rather dilute layer 26 at the upper part and a concentrated layer 27 at the lower part of the vessel. It is possible to attain an effective concentration of fine carbon powder of about 20 percent by weight or more at the lower part of the vessel 24, and this flows out at the lower openings 28. Via side-tube 29 solution is withdrawn at 30, and as this passes outlets 28 it carries with it the thick slurry of particles, and this is pumped to the other electrode compartment by means of bubble lift 33 or by any other suitable device. The electrode 31 is connected via wire 32 to a current source. The other electrode compartment is of similar construction, and thus it is possible to circulate a rather dilute slurry, and to establish a much higher effective concentration of particles adjacent the current collecting fixed electrodes.

The invention is illustrated with reference to the following examples which are by way of illustration only and which are to be construed in a non-limitative sense. It ought to be understood that various mechanical equivalents can be resorted to and that the values indicated in the examples are illustrative only and that other electrolytes etc. can be used without departing from the scope and spirit of the invention.

EXAMPLE 1

A stack comprising 40 membrane pairs of 75 cm$^2$ each and of a volume of 8×12×15 cm, the membrane area being 15×8 cm each, was arranged as described above. The anode and cathode compartments were filled with a slurry of 1 g cation exchange resin (Dowex 50), 1 g anion exchange resin (Amberlite IRA 68) and 2 g finely powdered active carbon per 100 ml of a 1% aqueous sodium chloride which was circulated at a rate of 150 ml/minute between the two compartments. The current density was 15 mA/cm$^2$ and desalination was carried out during 300 hours. The pH near the anode was about 9.3 and near the cathode about pH 9.6. No evolution of chlorine was detectable and no deterioration of the membranes bordering the anode and cathode compartments or of the electrodes was detectable.

EXAMPLE 2

A device and stack as described in Example 1 were set up, but the suspension circulated between the anode and the cathode compartments consisted of 7% by weight of fine carbon powder in 3% aqueous sodium chloride. This was circulated at a rate of 180 ml/minute between the two compartments. The pH near the anode was about 9.5 and near the cathode about 9.8. No chlorine was detectable during electrodialysis (during 250 hours) and no deterioration of the bordering membranes or of the electrodes took place.

EXAMPLE 3

A stack of Example 1 was used, but the electrode compartments were as described with reference to FIG. 2. The slurry used was of about 5% carbon content (in the form of very fine carbon particles) and this was circulated between the two electrode compartments. An effective concentration of an average of about 20 percent by weight was established in the electrode slurry adjacent the electrodes. No chlorine was evolved and the voltage drop between each of the electrodes and the adjacent brine cell was about 2.5 V at a current density of about 10 mA/cm$^2$. The stack was operated over many hundred hours and the carbon retained its efficacy. No deterioration of the membranes bordering the electrodes or of the electrodes was observed.

We claim:

1. An electrodialysis device, comprising in combination:
   an anode compartment;
   a compartment containing a stack of electrodialysis membranes;
   a cathode compartment, the volume of said cathode compartment being larger than the volume of said anode compartment;
   conduits between said anode and cathode compartments; and
   circulating means for circulating a slurry between said anode and said cathode compartments.

2. An electrodialysis device, comprising in combination:
   an anode compartment;
   a compartment containing a stack of electrodialysis membranes;
   a cathode compartment;
   conduits between said anode and said cathode compartments; and
   circulating means for circulating a slurry between said anode and said cathode compartments, said circulating means comprising a bubble lift.

3. An electrodialysis device, comprising in combination:
   an anode compartment;
   a compartment containing a stack of electrodialysis membranes;
   a cathode compartment;
   conduits between said anode and said cathode compartments;
   circulating means for circulating a slurry between said anode and said cathode compartments; and
   insert means in each of said anode and said cathode compartments for defining a constrictive outlet at the lower part of said insert means, thus establishing a concentration gradient in the slurry, with a higher concentration of the particles at the lower part of said anode and said cathode compartments.

4. An electrodialysis device, comprising in combination:
   an anode compartment;
   a compartment containing a stack of electrodialysis membranes;
   a cathode compartment;
   conduits between said anode and said cathode compartments;
   a slurry within the device comprising at least 5% by weight of a fine carbon powder in an electrolyte containing at least 2% by weight of sodium chloride; and
   circulating means for circulating said slurry between said anode and said cathode compartments.

5. An electrodialysis device, comprising in combination:
   an anode compartment;
   a compartment containing a stack of electrodyalysis membranes;
   a cathode compartment;
   conduits between said anode and said cathode compartments;
   a slurry within the device comprising at least 1% by weight of a fine carbon powder in combination with at least 1% of fine particles of ion exchange resin, in an electrolyte; and
   circulating means for circulating said slurry between said anode and said cathode compartments.

6. A device according to any one of claims 1-5 wherein said compartment containing a stack of electrodialysis membranes is disposed between said anode and said cathode compartments and wherein the borders between said anode and said cathode compartments, respectively, and said compartment containing a stack of electrolysis membranes comprise cation exchange membranes.

7. A device according to any one of claims 1-5 wherein said circulating means provide for a circulation of at least 1 ml/cm$^2$ electrode area/minute of the slurry.

8. A process of electrolysis using the electrodialysis device of only one of claims 1-3, comprising circulating a slurry of fine particles of carbon in an electrolyte between the anode and cathode compartments at a predetermined rate of circulation.

9. A process in accordance with claim 8, wherein, in said electrodialysis device, said compartment containing a stack of electrodialysis membranes is disposed between said anode and said cathode compartments and wherein the borders between said anode and said cathode compartments, respectively, and said compartment containing a stack of electrodialysis membranes comprise cation exchange membranes.

10. A process according to claim 9 wherein the slurry contains at least 5 percent by weight carbon particles in a solution of at least 2 percent by weight sodium chloride.

11. A process in accordance with claim 10 wherein said carbon particles comprise active carbon.

12. A process according to claim 9 wherein the slurry contains at least 1 percent fine carbon particles and at least 1 percent by weight of an anion-exchange resin, of cation exchange resin or a combination of such resins.

13. A process in accordance with claim 12, wherein said carbon particles comprise active carbon.

14. A process according to claim 9 wherein the rate of circulation is at least 1 ml/minute per cm$^2$ of membrane area.

15. A device in accordance with claims 4, 8 or 5 wherein said carbon powder comprises active carbon.

16. A process in accordance with claim 8, wherein said carbon particles comprise active carbon.

* * * * *